Patented Feb. 17, 1942

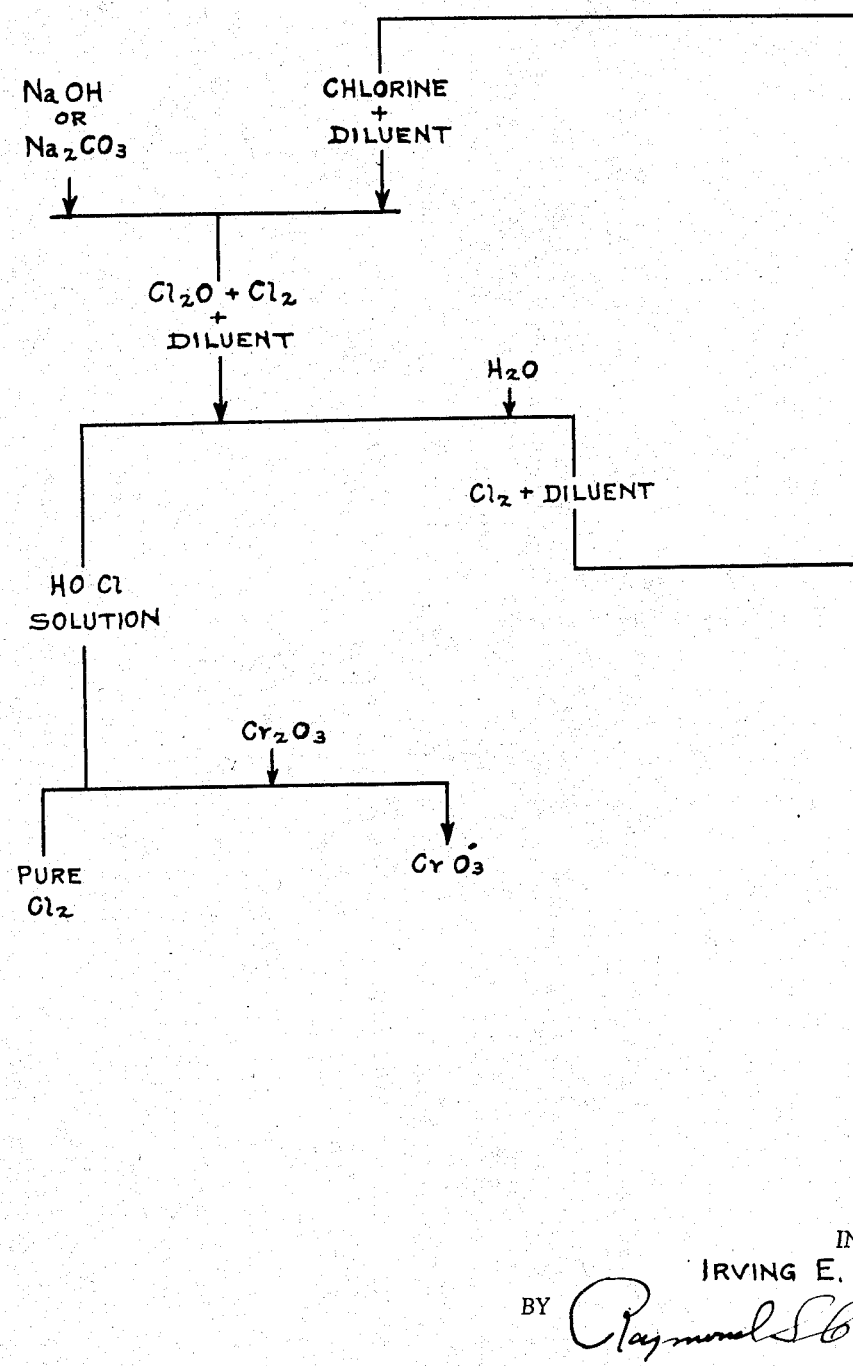

2,273,723

UNITED STATES PATENT OFFICE 2,273,723

RECOVERY OF CHLORINE FROM GASEOUS MIXTURES

Irving E. Muskat, Akron, Ohio, assignor to Pittsburgh Plate Glass Company, Allegheny County, Pa., a corporation of Pennsylvania Application April 14, 1939, Serial No. 267,917

12 Claims. (Cl. 23—145)

This invention relates to a method of recovering chlorine in concentrated form from chlorine mixtures which contain substantial amounts of other gaseous agents. It has long been recognized that a cheap economical method of recovering chlorine from other gases is desirable. Numerous reactions involving the use or manufacture of chlorine or chlorine compounds result in the production of chlorine gas which is greatly diluted with other gases such as air, nitrogen, oxygen, carbon dioxide or other gas which is normally insoluble in water. This is particularly true when various metallic chlorides such as iron, titanium, chromium, aluminum or silicon chlorides are thermally decomposed in air to form the corresponding oxides. The chlorine concentration resulting from such a process is often below 50 percent by volume and occasionally is as low as 5–10 percent.

Various processes have been suggested for the recovery of this chlorine. Attempts have been made to recover it by means of liquefaction processes. While this can be done, extensive compressing and refrigerating equipment is required and the process is uneconomical. Attempts to extract the chlorine by means of solvents often result in a substantial loss of solvent which is objectionable.

In accordance with the present invention I have found that substantially pure chlorine may be recovered from gaseous mixtures containing chlorine by intermediately converting the chlorine to chlorine monoxide. This chlorine monoxide may be dissolved in water or other solvent or may be recovered as such and may be treated with various agents which are capable of being oxidized, whereby relatively pure chlorine is evolved. The chlorine so produced is found to be of high purity.

In order to convert the dilute chlorine to chlorine monoxide, the gaseous mixtures may be contacted with a suitable agent such as active mercuric oxide or an alkaline alkali metal compound such as sodium hydroxide, sodium carbonate, sodium bicarbonate, etc. Details of processes suitable for this purpose may be found in copending applications Serial No. 136,802, 136,803, and 136,804 filed April 14, 1937, No. 190,618, filed Feb. 15, 1938, and 216,475, filed June 29, 1938, now Patents Nos. 2,155,281; 2,157,558; 2,157,559; 2,157,524 and 2,157,525 respectively. Other suitable methods for producing chlorine monoxide may be used. The accompanying drawing diagrammatically illustrates a suitable method of application of the process herein described.

The proportion of chlorine monoxide produced in a single treatment is dependent upon the method of treatment. When active mercuric oxide is used, substantially the entire quantity of chlorine in the gas may be converted into chlorine monoxide, if desired. On the other hand, where sodium carbonate or similar agent is used, the percentage conversion of chlorine monoxide is found to be substantially lower. In some cases it may be desirable to convert only a portion of the chlorine into chlorine monoxide and to use an excess of chlorine even when mercuric oxide is used for the conversion in order to insure complete utilization of this agent with maximum efficiency and to avoid explosive concentrations of chlorine monoxide. In such a case a mixture containing chlorine and chlorine monoxide is secured. In the usual operation of this process using agents such as sodium carbonate for the conversion, less than 75 percent of the chlorine is converted into chlorine monoxide and in general the conversion is below 40 percent of the chlorine.

The resulting gaseous mixture containing chlorine monoxide may then be treated for the recovery of chlorine monoxide. In accordance with one effective method of recovering the chlorine monoxide, the gaseous mixture may be contacted with a suitable solvent such as water or carbon tetrachloride. By limiting the amount of water used, it is possible to recover substantially all of the chlorine monoxide without dissolving an appreciable amount of chlorine.

The presence of the other inert gases exerts a noticeable depressing effect upon the solubility of chlorine and serves to substantially minimize any tendency for the chlorine to dissolve. This is particularly true when the amount of water used is limited to permit the formation of hypochlorous acid having a concentration in excess of 5 percent, since the solubility of chlorine in such a solution is somewhat lower than the solubility in water. For this reason it is desired to regulate the amount of water used in order to form a solution having a concentration of HOCl in excess of 5 percent by weight. After removal of the chlorine monoxide the gases may be recirculated for further production of chlorine monoxide.

The hypochlorous acid thus obtained is found to be of high purity and contains only minor quantities of chloride and chlorate. Upon contacting this acid with a compound which is capable of being oxidized by hypochlorous acid, such as the lower metallic oxides or the metallic chlorides, a large quantity of chlorine is given off. This chlorine is extremely pure and may be collected, dehydrated and stored for general use.

Various compounds may be used for liberation of chlorine. I have been able to secure particularly effective results in contacting hypochlorous acid with the lower oxides of chromium, such as CrO, $Cr_2O_3$, $CrO_2$, $Cr_5O_9$, etc. and in such a case the reaction to form chlorine is found to occur rapidly, with consequent production of chlorine and chromic acid. Thus, this process is effective in producing both chromic acid and chlorine in recoverable form. When chromic acid is generated by contacting lower oxides of chromium with hypochlorous acid as generally prepared, containing a substantial quantity of chloride ion, it is difficult to recover the chromic acid due to the presence of a substantial amount of chloride ion. This ion generally exists in present grades of hypochlorous acid. The separation of chloride from chromic acid is very difficult since the chloride tends to react with the chromic acid when attempts are made to isolate the acid. Since the hypochlorous acid prepared as set forth herein is substantially free from chlorides, containing less than 3 grams per liter of this material, the recovery of chromic acid in substantially pure form by evaporation is relatively simple.

Other oxidizable oxides such as stannous oxide or oxides of nickel or cobalt, ferrous oxide, etc., may be used for liberation of chlorine in accordance with this invention. Similarly oxidizable metals such as iron, or aluminum, or oxidizable chlorides such as hydrochloric acid or the chlorides of sodium, potassium, copper, zinc, calcium, magnesium, lithium or chromium or other metallic chloride.

In treating with hypochlorous acid it is preferred to apply heat to the solutions in order to stimulate the rate of reaction and to secure higher yields. Temperatures in excess of 50° C. are found to be desirable.

The process is of particular value in the recovery of chlorine from gases resulting from processes involving the thermal decomposition of metallic chlorides. Thus, in the manufacture of titanium dioxide, it is often desirable to decompose titanium tetrachloride or similar halide with air. This process usually results in the formation of a gaseous mixture containing but 35 percent by volume of chlorine, the balance being nitrogen and other inert gases. A similar mixture is produced upon thermal decomposition of chromic or chromous chloride or ferric chloride. The process may also be adapted to the recovery of chlorine from exhaust gases from electrolytic cells.

The following example is illustrative of the invention.

A quantity of chromic chloride was heated at a temperature of 500° C. in a stream of air whereby chromic oxide was formed and a gaseous mixture containing 30 percent by volume of chlorine and the balance oxygen and nitrogen was obtained. This gaseous mixture was countercurrently contacted with a quantity of hydrated sodium carbonate as described in copending application Serial No. 190,618, of George H. Cady, filed Feb. 15, 1938, and a mixture containing chlorine monoxide, chlorine, oxygen and nitrogen, was obtained. The mixture was then passed through a limited volume of water until a solution containing 15.6 percent by weight of hypochlorous acid was produced. The chlorine content of this solution was less than 0.3 percent. 110 parts by weight of the solution was mixed with 15 parts by weight of chromic oxide at a temperature of 90° C. and chlorine was evolved immediately in a vigorous reaction. The chlorine upon collection and after removal of moisture was 99 percent pure.

In the preparation of chlorine monoxide by interaction of chlorine and an agent such as mercuric oxide or an alkaline alkali metal compound such as sodium carbonate, a quantity of chlorine may be utilized in the formation of the corresponding metal chloride. If desired, the hypochlorous acid produced may be used to decompose these chlorides to release and recover the chlorine so consumed.

Although the present invention has been described with reference to the specific details of certain embodiments thereof, it is not intended that such details shall be regarded as limitations upon the scope of the invention except insofar as included in the accompanying claims.

I claim:

1. A method of recovering chlorine from a gaseous mixture which is derived from a process which results in the formation of a gaseous mixture containing chlorine and a substantial amount of other gaseous constituents which are normally insoluble in water which comprises treating the mixture to convert at least a substantial portion of the chlorine into chlorine monoxide, contacting the mixture with a quantity of water whereby the major portion of the chlorine monoxide is absorbed without absorption of a substantial amount of said gaseous constituents, and a solution of hypochlorous acid is produced, contacting the hypochlorous acid with an oxidizable material which is capable of reducing hypochlorous acid to generate chlorine and recovering the chlorine.

2. A method of recovering chlorine from a gaseous mixture which is derived from a process which results in the formation of a gaseous mixture containing chlorine and a substantial amount of other gaseous constituents which are normally insoluble in water which comprises treating the mixture to convert at least a substantial portion of the chlorine into chlorine monoxide, contacting the mixture with a quantity of water whereby the major portion of the chlorine monoxide is absorbed without absorption of a substantial amount of said gaseous constituents, and a solution of hyochlorous acid is produced, contacting the hypochlorous acid with an oxidizable metallic oxide which is capable of reducing hypochlorous acid to generate chlorine and recovering the chlorine.

3. A method of recovering chlorine from a gaseous mixture which is derived from a process which results in the formation of a gaseous mixture containing chlorine and a substantial amount of other gaseous constituents which are normally insoluble in water which comprises treating the mixture to convert at least a substantial portion of the chlorine into chlorine monoxide, contacting the mixture with a quantity of water, whereby the major portion of the chlorine monoxide is absorbed without absorption of a substantial amount of said gaseous constituents and a solution of hypochlorous acid is produced, contacting the hypochlorous acid with an oxidizable chromium oxide which is capable of reducing hypochlorous acid to generate chlorine and recovering the chlorine.

4. A method of recovering chlorine from a gaseous mixture which is derived from a process which results in the formation of a gaseous mixture containing chlorine and a substantial amount of other gaseous constituents which are normally insoluble in water which comprises treating the mixture to convert at least a substantial portion of the chlorine into chlorine monoxide, contacting the mixture with a quantity of water whereby the major portion of the chlorine monoxide is absorbed without absorption of a substantial amount of said gaseous constituents, and a solution of hypochlorous acid is produced, contacting the hypochlorous acid with a metallic chloride which is capable of reducing hypochlorous acid to generate chlorine and recovering the chlorine.

5. A method of recovering chlorine from a gaseous mixture which is derived from a process which results in the formation of a gaseous mixture containing chlorine and a substantial amount of other gaseous constituents which are normally insoluble in water which comprises treating the mixture to convert at least a substantial portion of the chlorine into chlorine monoxide, contacting the mixture with a quantity of water, sufficient to absorb the major portion of the chlorine monoxide but insufficient to absorb an appreciable amount of chlorine whereby a solution of hypochlorous acid is produced recycling the unabsorbed chlorine, contacting the hypochlorous acid with a chromic oxide which is capable of reducing hypochlorous acid to generate chlorine and recovering the chlorine.

6. A method of recovering chlorine from a gaseous mixture which is derived from a process which results in the formation of a gaseous mixture containing up to about 50 percent of chlorine and a substantial amount of other gaseous constituents which are normally insoluble in water which comprises treating the mixture to convert at least a portion of the chlorine into chlorine monoxide, contacting the mixture with a quantity of water, sufficient to absorb the major portion of the chlorine monoxide but insufficient to absorb an appreciable amount of chlorine whereby a solution of hypochlorous acid is produced recycling the unabsorbed chlorine, contacting the hypochlorous acid with an oxidizable material which is capable of reducing hypochlorous acid to generate chlorine and recovering the chlorine.

7. A method of recovering substantially pure chlorine which comprises decomposing a metallic chloride in air at a temperature sufficiently high to cause evolution of chlorine in admixture with nitrogen, treating the mixture to convert at least a substantial portion of the chlorine into chlorine monoxide, contacting the mixture with a quantity of water, whereby the major portion of the chlorine monoxide is absorbed without absorption of a substantial amount of said gaseous constituents, and a solution of hypochlorous acid is produced, contacting the hypochlorous acid with an oxidizable material which is capable of reducing hypochlorous acid to generate chlorine and recovering the chlorine.

8. A method of recovering chlorine from a gaseous mixture containing the same which comprises treating the mixture to convert at least a portion of the chlorine into chlorine monoxide, contacting the mixture with sufficient water to dissolve the chlorine monoxide, treating the resulting solution with an oxidizable material which is capable of reducing hypochlorous acid, whereby chlorine is liberated and recovering the liberated chlorine.

9. A method of preparing chromic acid and chlorine which comprises contacting a solution of hypochlorous acid, which is substantially free from chloride ion, with a lower oxide of chromium.

10. A method of preparing chromic acid and chlorine which comprises contacting a solution of hypochlorous acid which is substantially free from chloride ion, with a lower oxide of chromium at a temperature above 50° C., and removing evolved chlorine.

11. A method of recovering chlorine from a gaseous mixture containing not in excess of 50 percent chlorine and a substantial quantity of other gaseous constituents which are not soluble in water which comprises treating the mixture to convert up to 40 percent of the chlorine to chlorine monoxide and to form a gaseous mixture containing chlorine and chlorine monoxide, contacting the resulting mixture with a limited quantity of water sufficient to absorb the major portion of the chlorine monoxide but insufficient to absorb an appreciable amount of chlorine whereby a solution of hypochlorous acid is formed, recycling unabsorbed chlorine, contacting the hypochlorous acid with a material capable of reducing hypochlorous acid to generate chlorine and recovering the chlorine.

12. A method of recovering chlorine from a gaseous mixture containing not in excess of 50 percent chlorine and a substantial quantity of other gaseous constituents which are not soluble in water which comprises treating the mixture to convert up to 75 percent of the chlorine to chlorine monoxide and to form a gaseous mixture containing chlorine and chlorine monoxide, contacting the resulting mixture with a limited quantity of water sufficient to absorb the major portion of the chlorine monoxide but insufficient to absorb an appreciable amount of chlorine whereby a solution of hypochlorous acid is formed, recycling unabsorbed chlorine, contacting the hypochlorous acid with a material capable of reducing hypochlorous acid to generate chlorine and recovering the chlorine.

IRVING E. MUSKAT.